(12) United States Patent
Kitada et al.

(10) Patent No.: US 6,798,403 B2
(45) Date of Patent: Sep. 28, 2004

(54) POSITION DETECTION SYSTEM

(75) Inventors: Takashi Kitada, Ogori (JP); Kazuhiro Watanabe, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 261 days.

(21) Appl. No.: 09/983,243

(22) Filed: Oct. 23, 2001

(65) Prior Publication Data
US 2002/0047833 A1 Apr. 25, 2002

(30) Foreign Application Priority Data
Oct. 24, 2000 (JP) ........................................ 2000-323683

(51) Int. Cl.[7] ................................................ G09G 5/00
(52) U.S. Cl. ........................ 345/173; 345/174; 345/175; 345/177; 345/179
(58) Field of Search ................................. 345/158, 162, 345/173, 175–183; 710/73; 178/18.01–18.04, 18.09, 18.11, 19.01, 19.02, 19.05, 20.01–20.03; 341/5; 250/227.13; 367/118, 119, 124, 126–129

(56) References Cited

U.S. PATENT DOCUMENTS

| | | | | |
|---|---|---|---|---|
| 4,777,329 A | * | 10/1988 | Mallicoat | 178/19.02 |
| 5,365,461 A | * | 11/1994 | Stein et al. | 700/298 |
| 5,525,764 A | * | 6/1996 | Junkins et al. | 178/18.01 |
| 5,717,168 A | * | 2/1998 | DeBuisser et al. | 178/18.04 |
| 5,805,147 A | * | 9/1998 | Tokioka et al. | 345/173 |
| 6,100,877 A | * | 8/2000 | Chery et al. | 345/178 |
| 6,104,387 A | | 8/2000 | Chery et al. | 345/179 |
| 6,147,681 A | | 11/2000 | Chery et al. | 345/179 |
| 6,208,330 B1 | * | 3/2001 | Hasegawa et al. | 345/173 |
| 6,335,723 B1 | * | 1/2002 | Wood et al. | 345/173 |
| 6,424,340 B1 | * | 7/2002 | Holtzman et al. | 345/173 |
| 6,437,314 B1 | * | 8/2002 | Usuda et al. | 250/221 |
| 6,504,530 B1 | * | 1/2003 | Wilson et al. | 345/173 |
| 6,532,006 B1 | * | 3/2003 | Takekawa et al. | 345/173 |
| 6,577,299 B1 | * | 6/2003 | Schiller et al. | 345/179 |
| 6,583,723 B2 | * | 6/2003 | Watanabe et al. | 340/573.1 |

* cited by examiner

Primary Examiner—Bipin Shalwala
Assistant Examiner—Jeff Piziali
(74) Attorney, Agent, or Firm—Stevens, Davis, Miller & Mosher, LLP

(57) ABSTRACT

A system for detecting a position of a stylus movable on an interactive board includes a position information transmitter and information detection sections. The stylus has the transmitter for transmitting to the detection sections electromagnetic wave signals or light signals, and ultrasonic wave signals. The position is detected based on measurement of direct distances for signal transmission between the stylus and the detection sections. The detected position information is output to a personal computer, image projector, printer, etc. Each detection section has an opening sized so that the ultrasonic waves are advantageously transmitted through the opening and substantially radially from its center to its piezoelectric element.

22 Claims, 16 Drawing Sheets

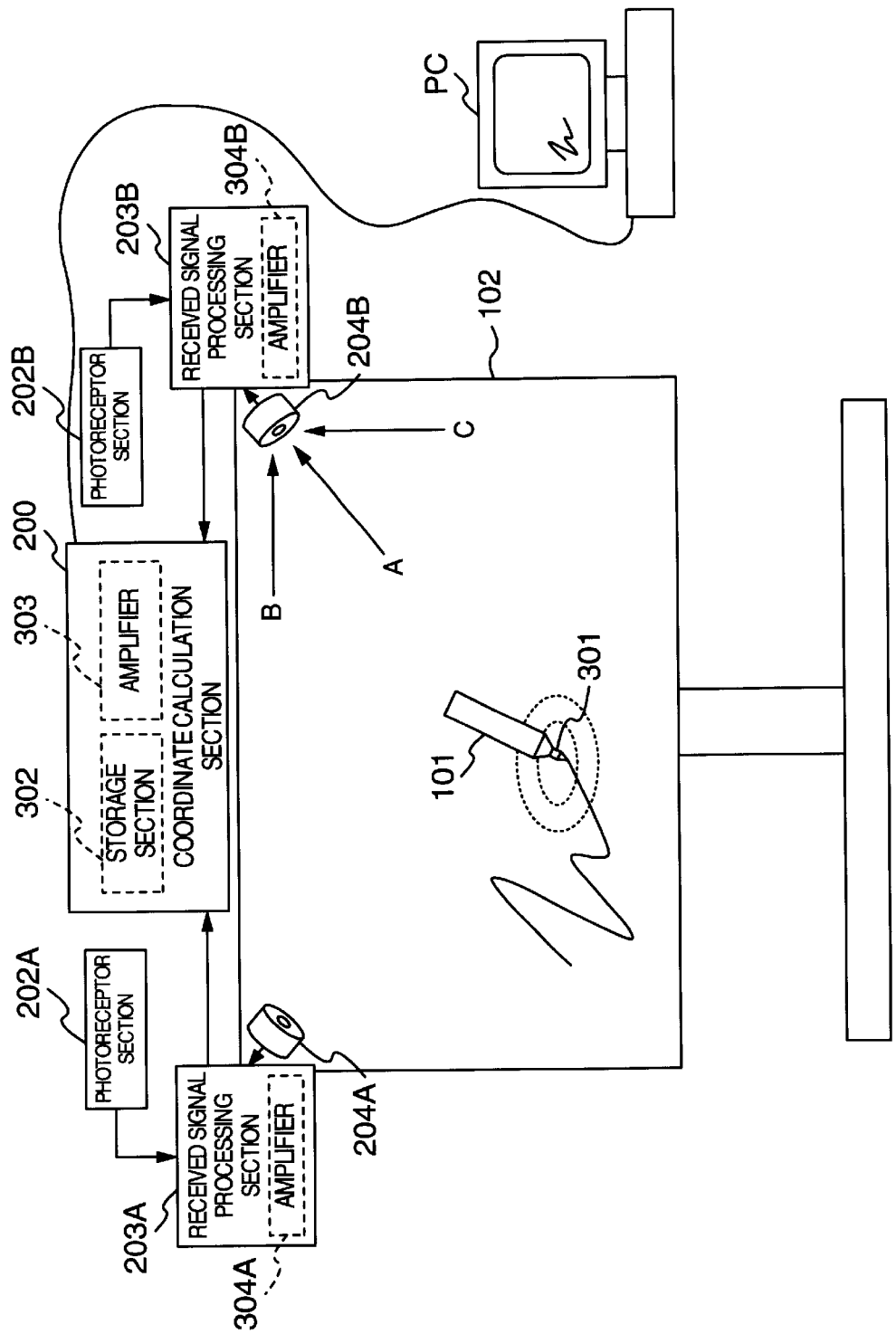

TABLE 1 (COLOR EXAMPLES)

| TIME DIFFERENCE | COLOR |
|---|---|
| T 1 | BLUE |
| T 2 | RED |
| T 3 | BLACK |

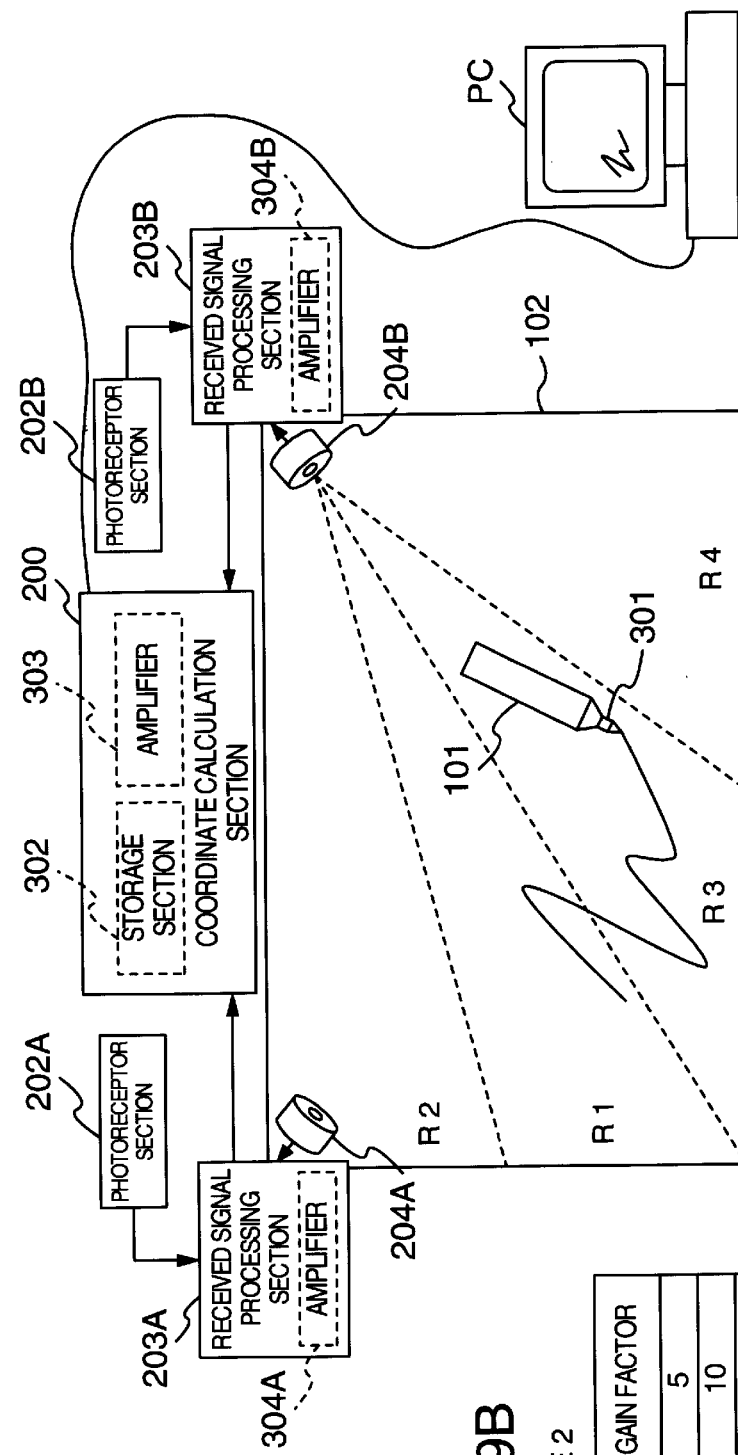

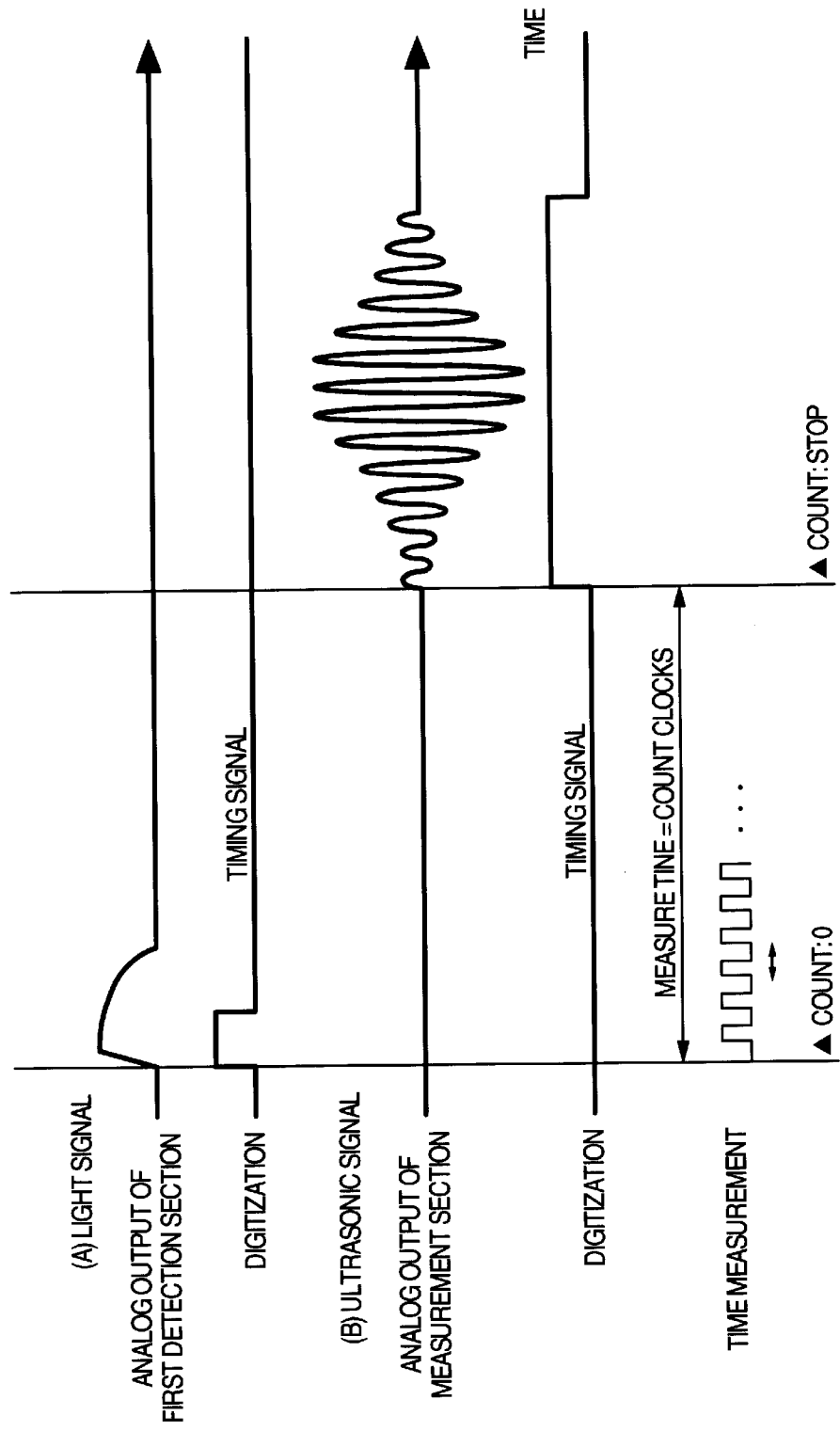

POSITION DETECTION SYSTEM

BACKGROUND OF THE INVENTION

The present invention relates to a position detection system and an interactive board employing the position detection system.

In interactive boards employing conventional position detection systems, ultrasonic waves transmitted by a stylus making contact with a board (coordinate data input plane) are generally reflected by one or more reflecting plates (located, for example, on upper right and left sides of such a vertical interactive board) and the reflected ultrasonic waves are received by one or more ultrasonic wave sensors, and the position of the stylus is detected based on the received ultrasonic wave signals. For example, U.S. Pat. Nos. 6,100,877; 6,104,387; and 6,147,681 are referred to. Images displayed on the screen of a personal computer are projected by a projector onto the coordinate data input plane of such an interactive board, and instructions to the display screen of the personal computer are given by use of the stylus, thereby switching of images displayed on the display screen of the personal computer, touch-up or correction of displayed images, etc. are made possible.

SUMMARY OF THE INVENTION

The primary object of the present invention is to provide a position detection system capable of receiving signals (ultrasonic wave signals etc.) transmitted by transmitter means such as stylus movable on the coordinate data input plane and thereby conducting the position data input or position detection with high precision.

In accordance with one aspect of the present invention, there is provided a position detection system comprising: movable transmitter means for generating to transmit an electromagnetic wave and an ultrasonic wave; first detection means for detecting the electromagnetic wave from the transmitter means; second detection means for detecting the ultrasonic wave from the transmitter means; and position detection means for detecting the position of the transmitter means based on the result of the detection by the first detection means and the second detection means. The second detection means has an opening through which the ultrasonic wave passes so as to be detected thereafter. The opening is formed so that the ultrasonic wave passing through the opening will propagate radially from the center of the opening.

BRIEF DESCRIPTION OF THE DRAWINGS

The objects and features of the present invention will become more apparent from the consideration of the following detailed description taken in conjunction with the accompanying drawings, in which:

FIG. 2A is a block diagram showing a specific example of the position detection system of the first embodiment using light and ultrasonic waves.

FIG. 9A is a block diagram showing the composition of a position detection system in accordance with a second embodiment of the present invention, and FIG. 9B is a table for explaining the characteristics of the position detection system of the second embodiment;

FIG. 14A is a timing chart for explaining timing signals which are generated by a timing signal generation section of the system of the second embodiment.

DESCRIPTION OF THE EMBODIMENTS

Figure 1:
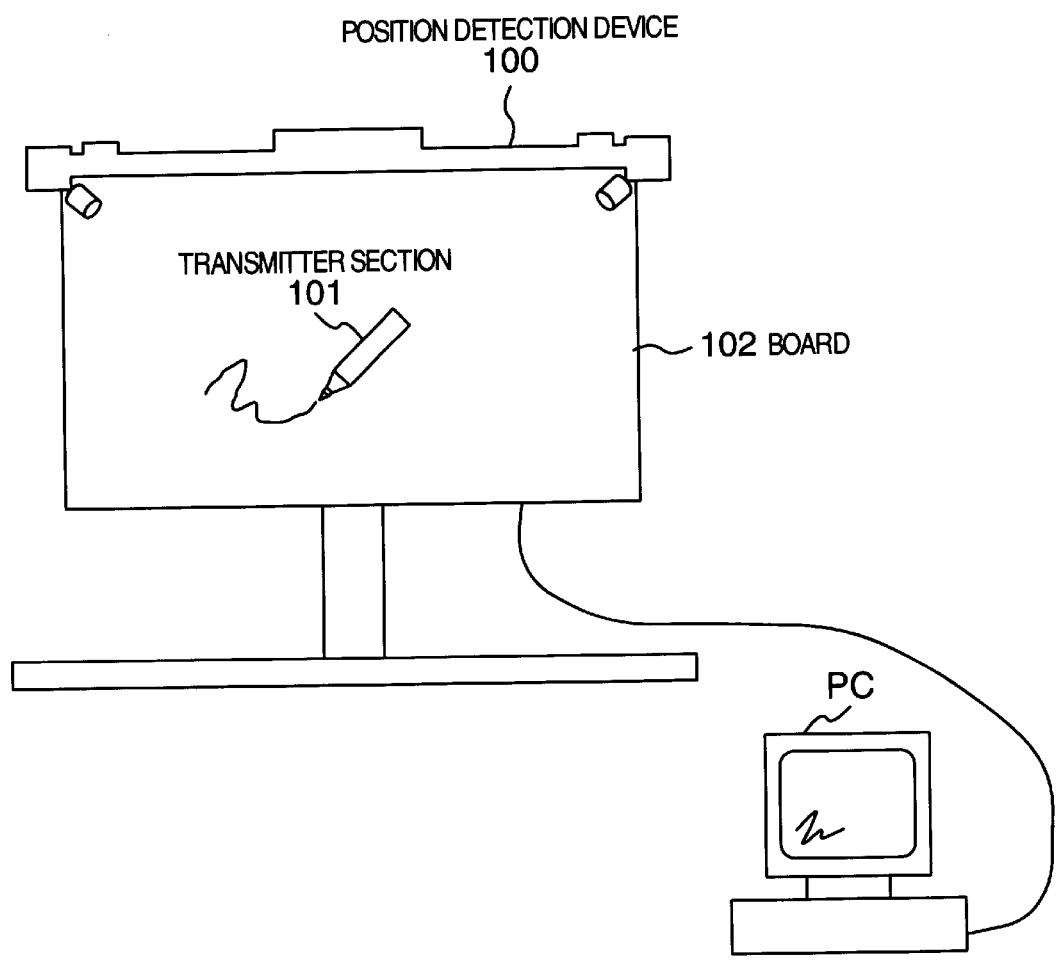
FIG. 1 is a schematic diagram showing a position detection system in accordance with a first embodiment of the present invention.

Referring now to the drawings, a description will be given in preferred embodiments in accordance with the present invention.

[Embodiment 1]

FIG. 1 is a schematic diagram showing a position detection system in accordance with a first embodiment of the present invention. In FIG. 1, reference numeral "100" denotes a position detection device, "101" denotes a signal-wave transmitter section (hereafter, also referred to as a "stylus") which transmits electromagnetic waves (such as light) and ultrasonic waves simultaneously, "102" denotes a board as a coordinate data input plane, and "PC" denotes a personal computer which is connected to the position detection device 100. The electromagnetic waves transmitted by the stylus 101 can also be substituted with radio waves. The position detection device 100 is provided to the top of the board 102 detachably. The user of the position detection system holds the stylus 101 and writes letters, symbols, figures, etc. on the board 102. Incidentally, in the position detection system of the first embodiment, the stylus 101 is not necessarily required to transmit the electromagnetic waves and ultrasonic waves simultaneously, although stylus 101 is adapted to generate and transmit the light and the ultrasonic waves.

FIG. 2A is a block diagram showing an example of the composition of the position detection system of the first embodiment. In the example of FIG. 2A, light (as the electromagnetic waves) and ultrasonic waves are used for the position detection.

The position detection system 300 shown in FIG. 2A includes: a stylus 101 having an ultrasonic vibration element 301; a coordinate data input plane 102; a coordinate calculation section 200 for calculating or computing to detect the coordinates of the position where the stylus 101 exists; photoreceptor sections 202A and 202B for receiving light which is transmitted by the stylus 101; received signal processing sections 203A and 203B; and ultrasonic wave sensors 204A and 204B for receiving ultrasonic waves which are transmitted by the ultrasonic vibration element 301 of the stylus 101.

Each of the received signal processing sections 203A and 203B includes an amplifier (304A, 304B) for amplifying received ultrasonic waves. The coordinate calculation section 200 includes a storage section 302 for storing calculated coordinates and an amplifier 303 for changing the amplification levels of the amplifiers 304A and 304B for predetermined coordinate values.

Figure 2B:
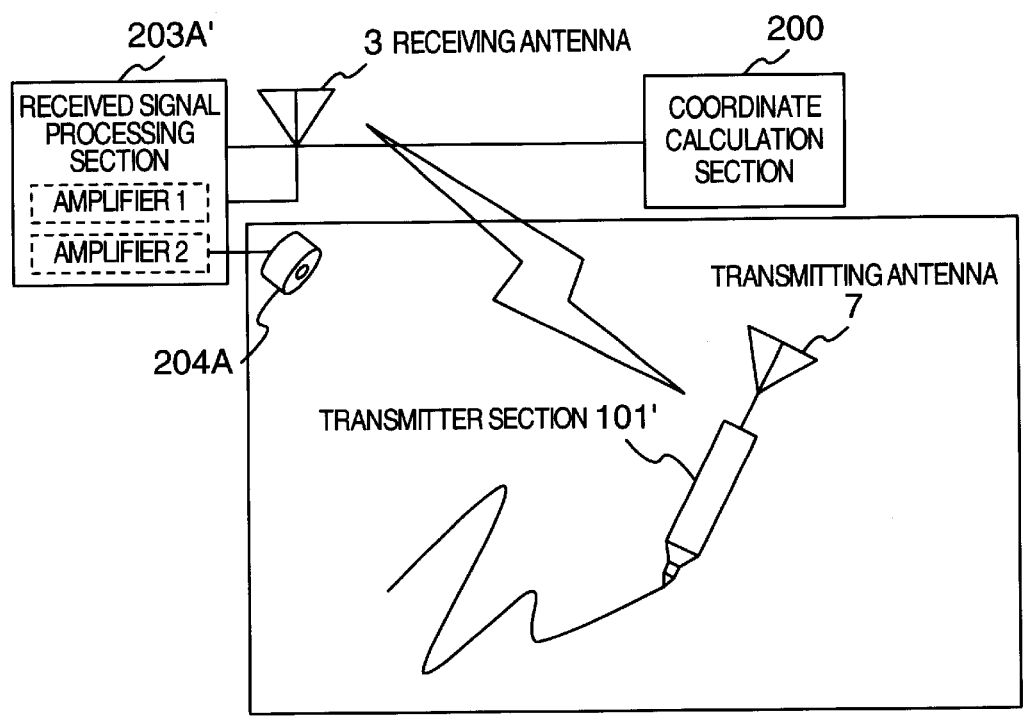
FIG. 2B is a partial block diagram showing another example of the position detection system of the first embodiment, which shows a use of radio waves instead of the light in the example of FIG. 2A.

FIG. 2B is a schematic block diagram showing another example of a position detection system which employs a radio wave in place of the light which has been employed by the position detection system of FIG. 2A. A stylus 101' shown in FIG. 2B, having a transmitting antenna 7, amplifies a reference signal and thereby transmits a radio wave from the transmitting antenna 7. A received signal processing section 203A' is provided with two amplifiers 1 and 2 and a receiving antenna 3. The amplifier 1 amplifies the radio wave signal received by the receiving antenna 3 and thereby obtains a reference signal for generating a timing signal. The amplifier 2 amplifies an ultrasonic wave signal received by an ultrasonic wave sensor 204A and thereby generates another timing signal to be used for time measurement based on the obtained reference signal. One or more receiving antennas 3 are used.

Figure 3:
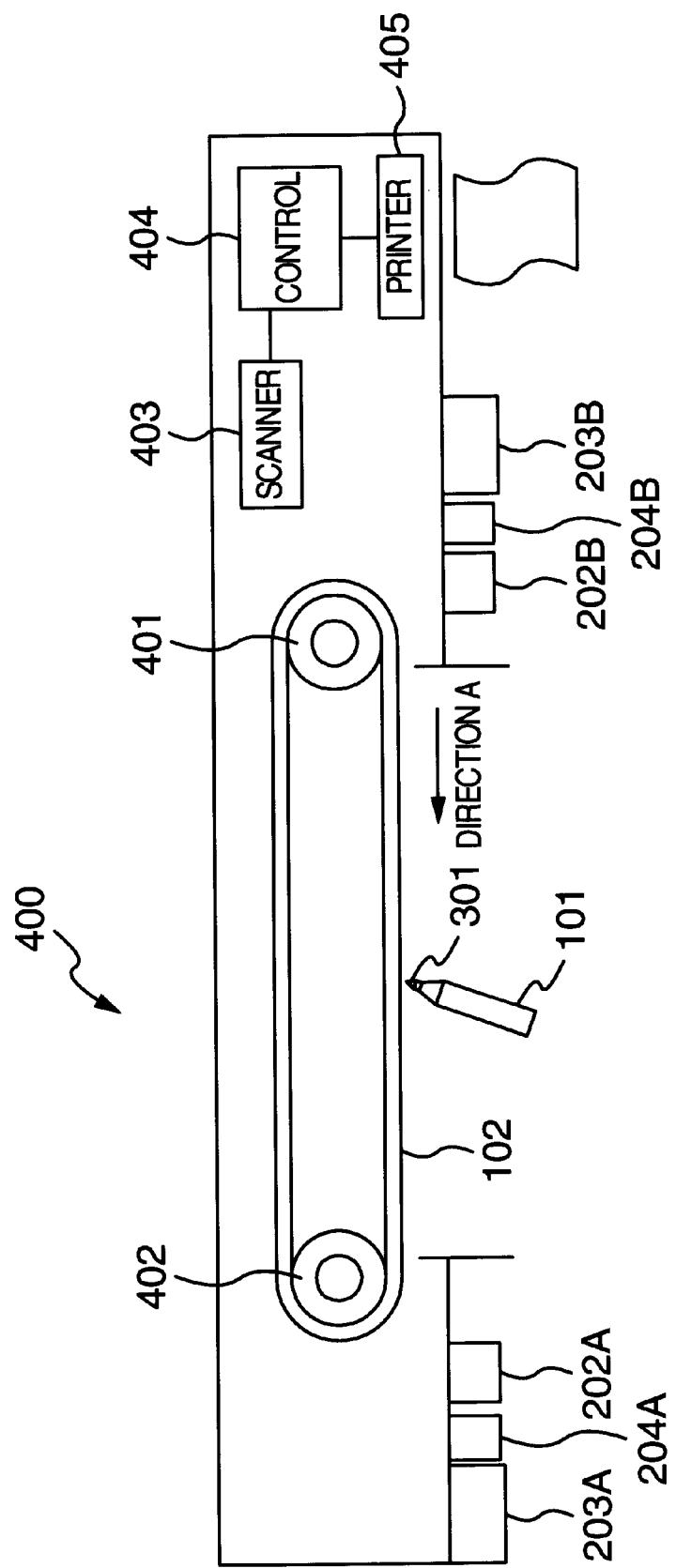
FIG. 3 is a schematic diagram for explaining functions of elements of the system shown in FIG. 2A.

The position detection system of the first embodiment will be explained more in detail referring to FIG. 3. Ultrasonic waves and light are transmitted by the stylus 101 having the ultrasonic vibration element 301 at predetermined periods, and are received by the ultrasonic wave sensors 204A and 204B and the photoreceptor sections 202A and 202B. Each received signal processing section (203A, 203B) processes received signals supplied from the ultrasonic wave sensor (204A, 204B) and the photoreceptor section (202A, 202B) which received the ultrasonic waves and light and thereby generates timing signals. In the coordinate calculation section 200, propagation time of the ultrasonic wave is measured by use of the timing signals concerning the reception of the light and the sound wave (ultrasonic wave), thereby the distances between the stylus 101 and the ultrasonic wave sensors 204A and 204B are measured, and thereby the coordinates of the stylus 101 are obtained. A detailed explanation on the timing signals will be given later referring to FIG. 14A.

Referring again to FIG. 3, the reference numeral "102" denotes a sheet material on which letters, images, etc. can be written by use of writing instruments such as stylus materials and images can be projected by an unshown projector, "401" denotes a drive roller for driving the sheet material 102 in the direction A which is shown in FIG. 3, "402" denotes a driven roller which guides the sheet material 102 being driven by the driving power of the drive roller 401, "403" denotes a scanner for reading images etc. written on the sheet material 102, "405" denotes a thermal printer as an output section for printing out images (which are read by the scanner 403 or projected by the projector) onto paper etc., "404" denotes a control section. The control section 404 is connected to an unshown personal computer for controlling the scanner 403, the thermal printer 405 and the position detection system.

In the following, an example of the composition of the ultrasonic wave sensor (204A, 204B) which is employed in the position detection system of the first embodiment will be explained referring to FIGS. 4 and 5.

Figure 4:
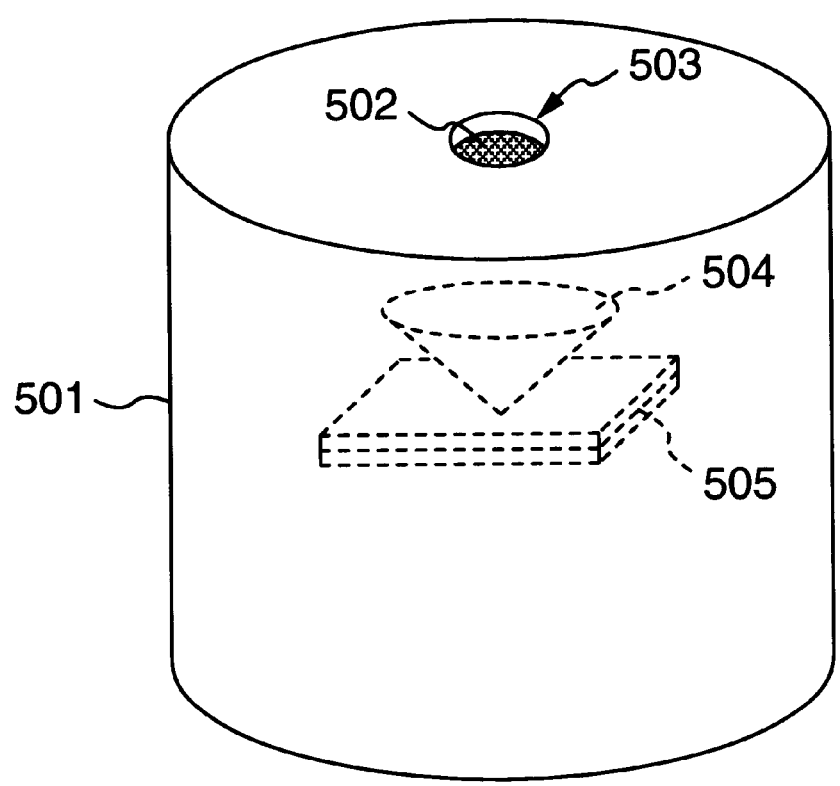
FIG. 4 is a perspective view of an ultrasonic wave sensor which is employed in the system of the first embodiment.
Figure 5A:
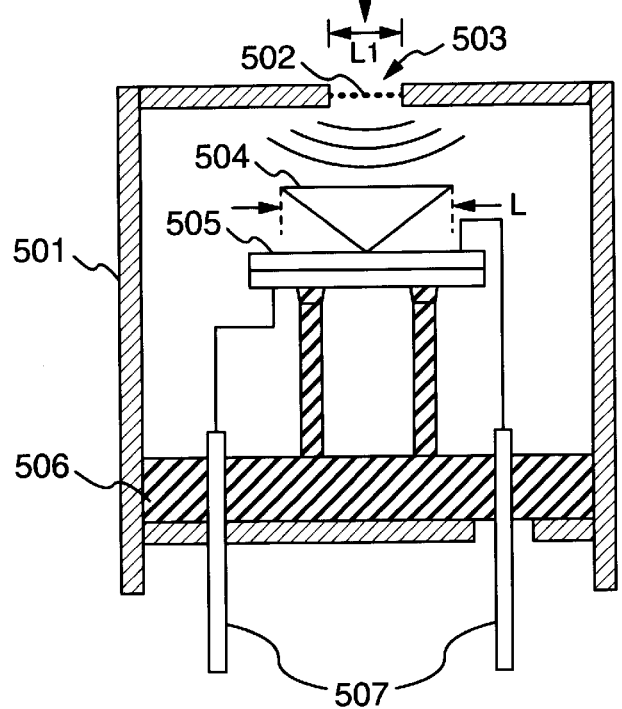
FIG. 5A is a cross-sectional view showing the composition of the ultrasonic wave sensor of FIG. 4.

The ultrasonic wave sensor shown in FIGS. 4 and 5A includes a case 501 in the shape of a cylinder, a protective screen 502, an opening 503 from which the ultrasonic wave enters the ultrasonic wave sensor, a cone section 504 in the shape of a cone for receiving the ultrasonic wave which passed through the opening 503, and a piezoelectric element 505 which is placed in contact with the cone section 504 for transducing the sound wave (ultrasonic wave) gathered by the cone section 504 into an electric signal.

Figure 5B:
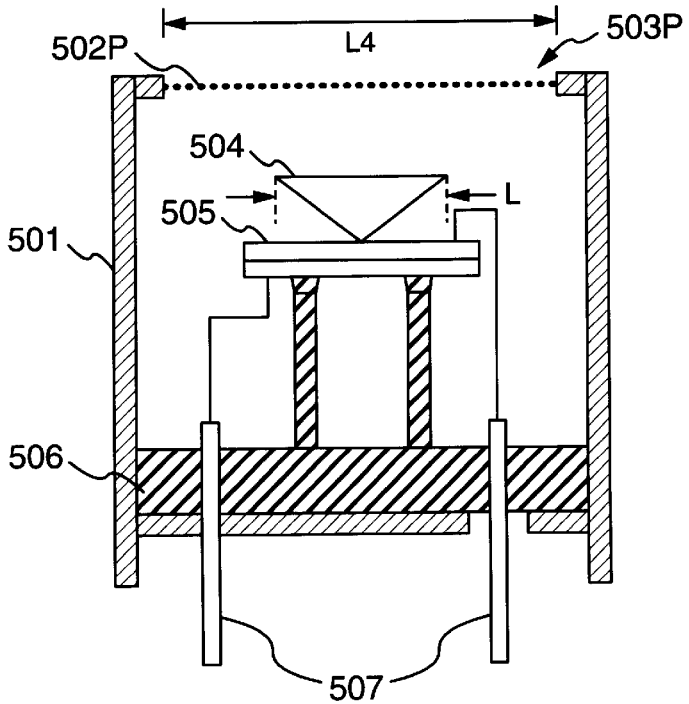
FIG. 5B is a similar view showing a conventional ultrasonic wave sensor.
Figure 6:
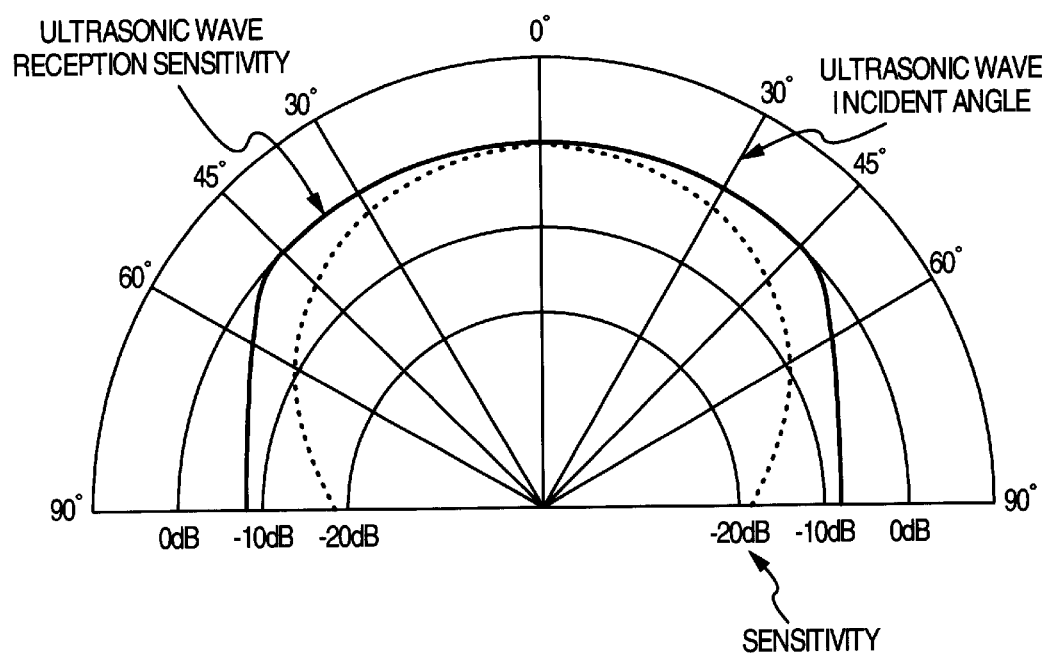
FIG. 6 is a directivity diagram showing the directivity of the reception sensitivity of the ultrasonic wave sensor which is employed in the first embodiment.

FIG. 5A is a cross-sectional view showing the composition of the ultrasonic wave sensor of FIG. 4. FIG. 5B is a cross-sectional view showing an ultrasonic wave sensor used in a similar system of the conventional type using the ultrasonic wave reflecting plates, the FIG. 5B sensor being substantially identical with that shown in FIG. 5A except having the respective opening 503P and protective screen 502P of a different diameter. Assuming the opening diameter of FIG. 5A sensor as "L1", that of cone section as "L" and, opening diameter of FIG. 5B sensor as "L4", a relation of L<L1<L4 holds. Again referring to FIG. 5A in which an insulator 506 and electric terminals 507 are shown. FIG. 6 is a directivity diagram showing by a fat line curve the directivity of the reception sensitivity of the ultrasonic wave sensor employed in the first embodiment of the present invention, and showing by a dotted line curve that of the FIG. 5B sensor used in the conventional system.

The ultrasonic wave sensor of FIGS. 4 and 5A operates as follows. The ultrasonic wave transmitted by the stylus 101 enters the ultrasonic wave sensor through the opening 503 and reaches the cone section 504, thereby the cone section 504 is vibrated in the vertical direction. The vibration of the cone section 504 is transmitted to the piezoelectric element 505 and thereby the vibration is transduced into electricity. The electricity travels to the electrical terminals 507 and thereby a voltage signal occurs.

In the case where the protective screen 502 of the ultrasonic wave sensor is formed in the shape of a meshed net, one mesh size is not used as the opening 503 for the reception of the ultrasonic waves but the whole of the protective screen 502 is used as the opening 503. According to the "Huygens' principle", sound waves (ultrasonic waves) entering the opening 503 at various incident angles spread to a specific direction from the opening 503 which is regarded as an ultrasonic wave source. The ultrasonic wave sensor of the embodiment employs such a physical low, thereby the ultrasonic wave reception sensitivity of the ultrasonic wave sensor becomes constant for any incident angle within ±45° (relative to the arrow shown in FIG. 5A) as shown in FIG. 6.

Therefore, if the ultrasonic wave sensors 204A and 204B are set at the upper left-hand corner and the upper right-hand corner of the board 102 (coordinate data input plane) as shown in FIG. 2A, signal intensity of the ultrasonic wave received by the ultrasonic wave sensor 204B becomes dependent substantially on the distance between the stylus 101 and the ultrasonic wave sensor 204B, that is, independent of the angle (directions A, B and C shown in FIG. 2A) of the ultrasonic vibration element 301 of the stylus 101 seen from the ultrasonic wave sensor 204B.

Incidentally, FIGS. 1, 2A, and 9A are elevation views of board 102 showing therearound layout of various elements such as ultrasonic wave sensors 204A and 204B. The sensors 204A and 204B are directed parallel to the surface of the board 102 and in the directions (45°) shown in the Figures. As seen in FIG. 2A, the position of the stylus 101 (moving on the surface of the board 102) seen from the ultrasonic wave sensor 204B is limited between the directions A and B (±45°) shown in FIG. 2A, thereby the angular independence of the received ultrasonic signal intensity is realized (see FIG. 6).

Since the received ultrasonic signal intensity has become a simple function of the distance (between the stylus 101 and the ultrasonic wave sensor 204B), the intensity can easily be fixed at a constant level as will be explained below if an amplifier 304B whose amplification factor can be varied with time is employed in the received signal processing section 203B.

Figure 14B:
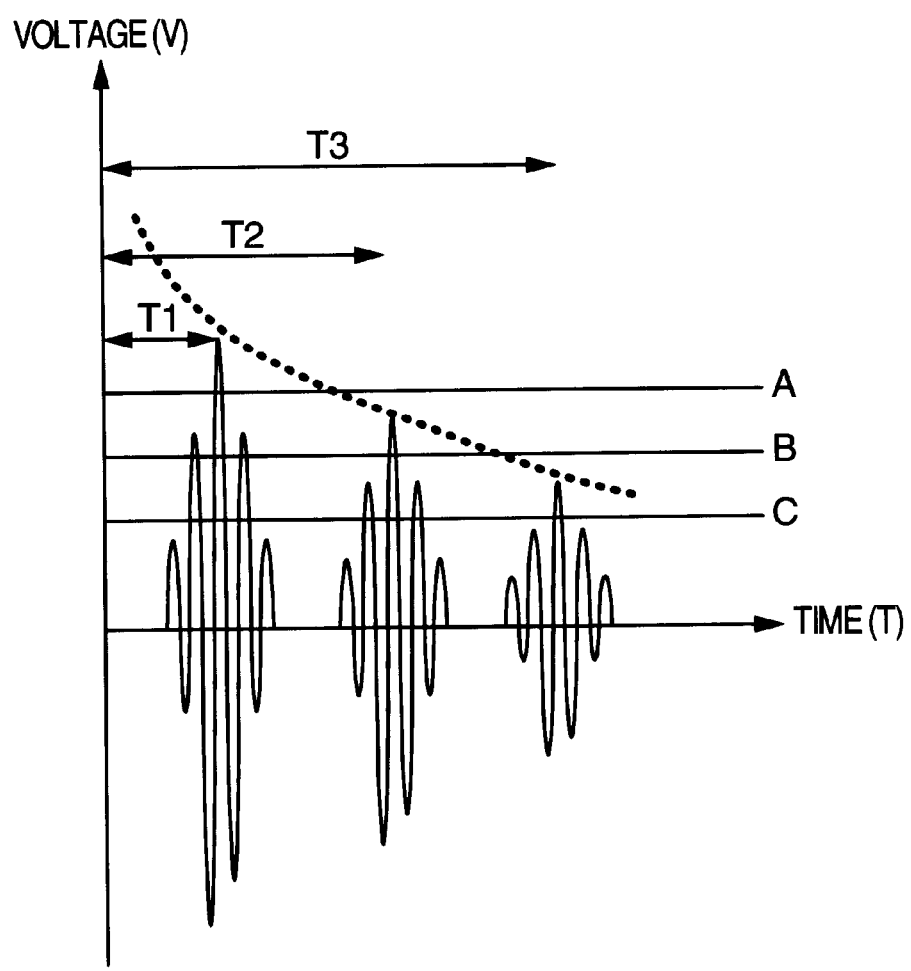
FIG. 14B is a graph showing the relationship between ultrasonic wave propagation time and received ultrasonic signal intensity.

FIG. 14B is a graph showing the relationship between propagation time of the ultrasonic wave (proportional to the distance between the stylus 101 and the ultrasonic wave sensor 204B) and the received ultrasonic signal intensity (voltage). The horizontal axis of the graph denotes propagation time T of the ultrasonic wave (between transmission and reception), therefore, the horizontal axis also indicates the distance between the stylus 101 and the ultrasonic wave sensor 204B. As the time T gets longer (that is, as the stylus 101 gets farther from the ultrasonic wave sensor 204B), the ultrasonic wave propagating in the air is attenuated more. Therefore, the received ultrasonic signal intensity becomes high when the propagation time T is short (T1) (i.e. when the distance is short), and the received ultrasonic signal intensity becomes low when the propagation time T is long (T3) (i.e. when the distance is long). Therefore, by changing the reception gain of the amplifier 304B depending on the time T, the received ultrasonic signal intensity can be kept at or adjusted to a constant level. In the case where the received ultrasonic signal intensity is maintained constant, the arrival time of the ultrasonic wave can be measured by comparing the received ultrasonic signal intensity with a predetermined voltage A (slice level) which is shown in FIG. 14B (that is, by judging when the intensity exceeds the slice level A). The received signal processing section 203B generates the timing signal correctly by means of such comparison.

On the other hand, it is also possible to let the received signal processing section 203B conduct the comparison (for the generation of the timing signal) by use of a constant reception gain. In the case where the constant reception gain is employed by the received signal processing section 203B (amplifier 304B), the slice level voltage is changed (as A, B and C shown in FIG. 14B) depending on the time T. Also by such comparison, the arrival time of the ultrasonic wave can be measured precisely and the timing signal can be generated correctly. Incidentally, in the case of FIG. 14B, the term "intensity" means the intensity of the third wave in the ultrasonic wave packet. If the "wave" to be used for the time measurement is changed (third wave when the stylus 101 is near and fourth wave when the stylus 101 is far, for example), distance error (approximately 8.6 mm of one wavelength, for example) is caused and the measurement of the distance between the stylus 101 and the ultrasonic wave sensor 204B can not be done correctly.

Further, in the position detection system of the first embodiment, each ultrasonic wave sensor (204A, 204B) receives the ultrasonic wave directly (not through a reflecting mirror) differently from the case of the conventional position detection system, therefore, the position coordinates of the stylus 101 can be detected correctly even when the stylus 101 is located in the vicinity of the ultrasonic wave sensor (204A, 204B).

As described above, in the position detection system in accordance with the first embodiment of the present invention, the ultrasonic wave sensors 204A and 204B are designed to receive the ultrasonic wave from the stylus 101 directly, thereby the reception units can be implemented in small sizes. Further, the opening 503 of the ultrasonic wave sensor is formed so that the ultrasonic wave passing through the opening 503 will propagate radially from the center of the opening 503, thereby the angular independence of the received ultrasonic signal intensity is realized and the received ultrasonic signal intensity is easily maintained constant, therefore, the coordinate calculation can be executed precisely by use of a simple processing circuit.

Figure 7:
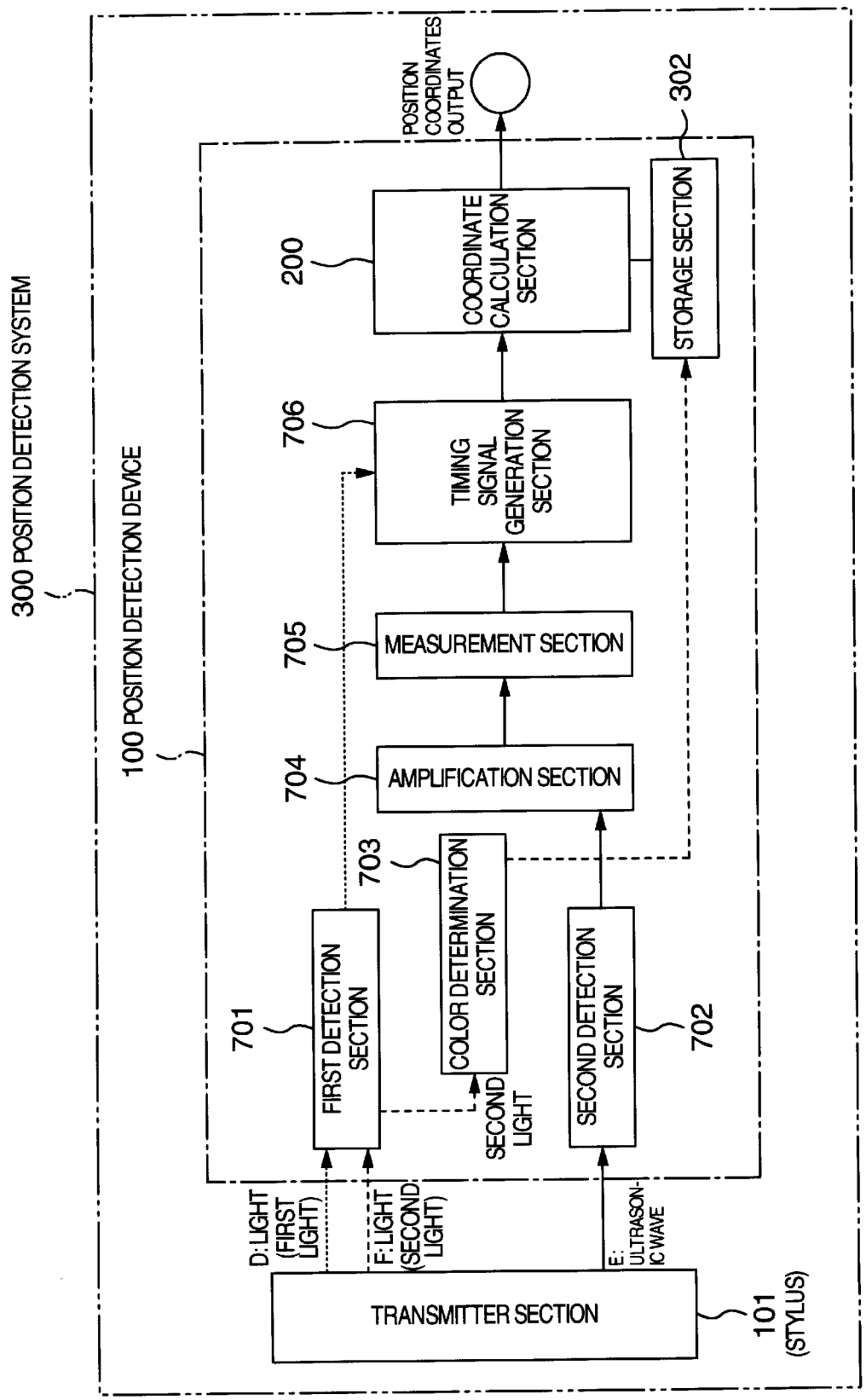
FIG. 7 is a block diagram showing functional blocks of the position detection system shown in FIG. 2A.

In the following, the position detection system of the first embodiment will be explained more in detail referring to FIG. 7. The position detection system 300 shown in FIG. 7 includes the stylus 101 (transmitter section) and the position detection device 100 (position detection section). The position detection device 100 shown in FIG. 7 includes a first detection section 701, a second detection section 702, a color determination section 703, an amplification section 704, a measurement section 705, a timing signal generation section 706, and the coordinate calculation section 200 (including the storage section 302).

The first detection section 701 receives and detects a first light signal and a second light signal which are transmitted by the transmitter section 101 (stylus). The second light signal is transmitted by the transmitter section 101 after the transmission of the first light signal. The second detection section 702 receives and detects an ultrasonic wave signal which is transmitted by the transmitter section 101. As shown by dashed arrow line, the second light signal is transmitted to the color determination section 703 which detects time difference between the first light signal and the second light signal in order to detect as a color representing signal or designate a corresponding color signal. A detailed explanation of the color determination section 703 will be given later referring to FIG. 8A.

The amplification section 704 (amplifiers 304A and 304B shown in FIG. 2A) amplifies the ultrasonic wave signal detected by the second detection section 702. The measurement section 705 measures the ultrasonic wave signal which has been amplified by the amplification section 704. The timing signal generation section 706 generates (digital) timing signals by use of the outputs of the first detection section 701 and the measurement section 705. The coordinate calculation section 200 calculates the position coordinates (X, Y) of the transmitter section 101 by figuring out the ultrasonic wave propagation time based on the timing signals generated by the timing signal generation section 706. The coordinate calculation section 200 is provided with the storage section 302 for storing information concerning the position coordinates of the transmitter section 101 which have been obtained based on the detection by the first detection section 701 and the second detection section 702.

The position detection system shown in FIG. 7 operates as follows. First, the transmitter section 101 transmits the first light signal and the ultrasonic wave signal simultaneously in order to inform the position detection device 100 of the position of the transmitter section stylus 101 on the board. Subsequently, the first detection section 701 and the second detection section 702 detect the first light signal and the ultrasonic wave signal respectively for the generation of the timing signals. The ultrasonic wave signal detected by the second detection section 702 is amplified by the amplification section 704, and the amplified ultrasonic wave signal is measured by the measurement section 705. Subsequently, the timing signals are generated by the timing signal generation section 706 by use of the outputs of the first detection section 701 and the measurement section 705. The position coordinates (X, Y) of the stylus 101 is calculated by the coordinate calculation section 200 by use of the timing signals generated by the timing signal generation section 706. The position coordinate information obtained as above is stored in the storage section 302 of the coordinate calculation section 200.

FIG. 14A illustrates the generation of the timing signals which is conducted by the timing signal generation section 706. Two timing signals are generated by digitizing analog outputs of the first detection section 701 and the measurement section 705. Each digitization is executed by the aforementioned comparison with a slice level. The coordinate calculation section 200 figures out the propagation time of the ultrasonic wave signal by counting the clocks between the rising edges of the two timing signals and thereby obtains the distance between the stylus 101 and each ultrasonic wave sensor (204A, 204B). The position coordinates of the stylus 101 is obtained by use of the obtained distances from the stylus 101 to the ultrasonic wave sensors 204A and 204B.

Figures 8A, 8B:
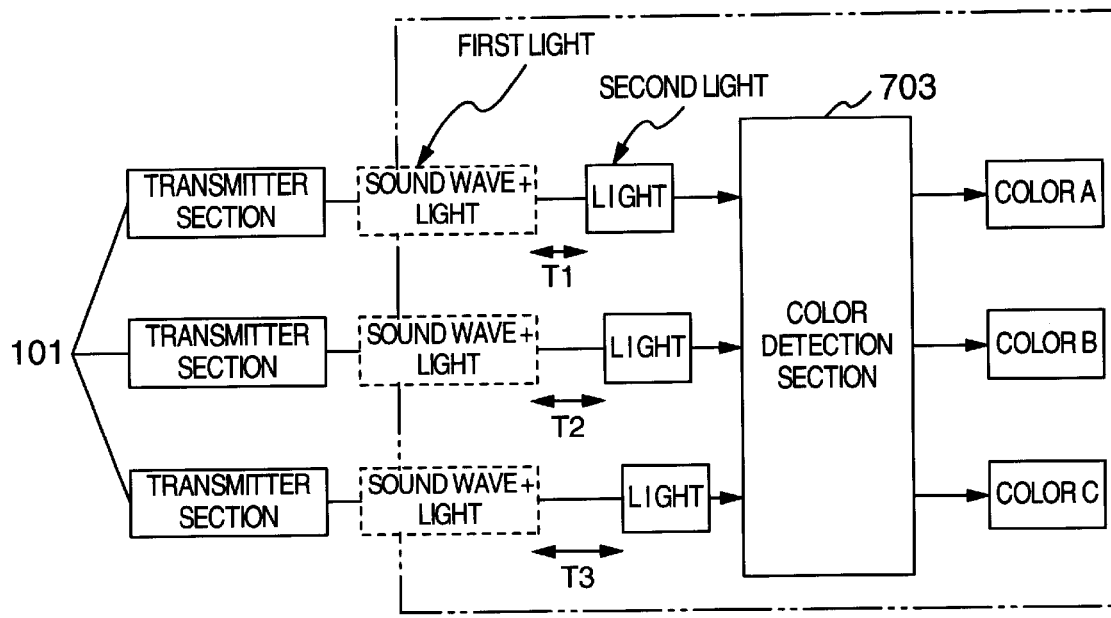
FIGS. 8A and 8B are block diagrams for explaining "color detection" which is executed by a color detection section of the system shown in FIG. 2A.

Next, the color determination section 703 will be explained in detail referring to FIG. 8A. The transmitter section 101 transmits the second light signal after the simultaneous transmission of the first light signal and the ultrasonic wave signal. The color determination section 703 is adapted to determine a color based on or corresponding to on the time difference between the first light signal and the second light signal which are transmitted by the transmitter section 101. FIG. 8B is a table showing an example of the color detection which is executed by the color determination section 703. In the example of FIG. 8B, the color determination section 703 detects time differences T1, T2 and T3 as blue, red and black, respectively. As shown by dashed arrow connection line in FIG. 7, a color is detected (determined) by the color determination section 703 by use of the second light signal transmitted by the transmitter section 101, and the detected color information is stored in the storage section 302. The coordinates of the stylus 101 detected by use of the first light signal and the ultrasonic wave signal are displayed in a color corresponding to the color information.

[Embodiment 2]

Figure 10:
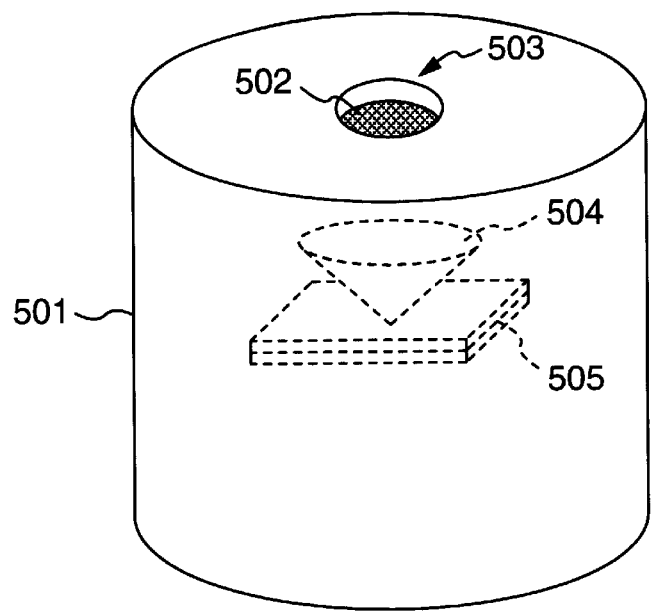
FIG. 10 is a perspective view of an ultrasonic wave sensor employed in the position detection system of the second embodiment.
Figure 11:
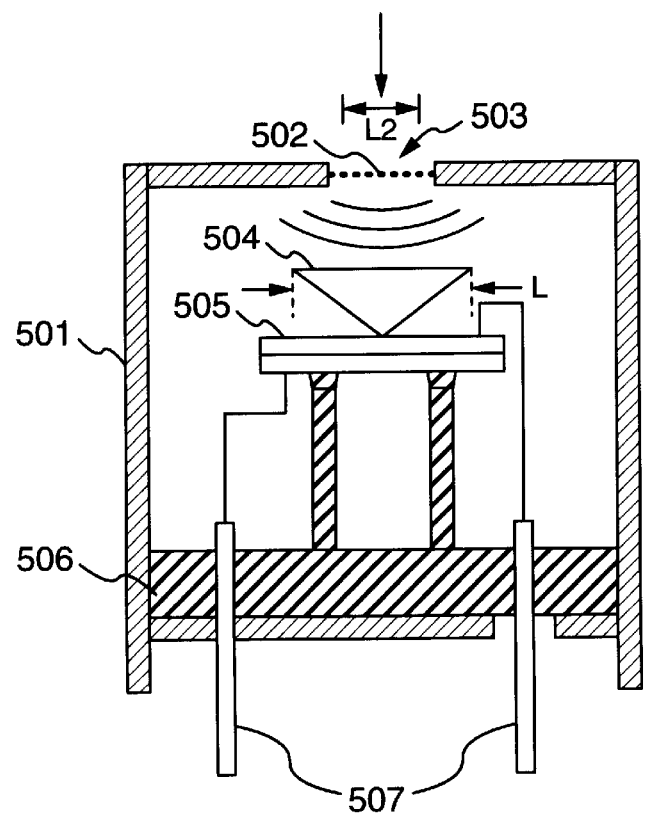
FIG. 11 is a cross-sectional view showing the composition of the ultrasonic wave sensor of FIG. 10.
Figure 12:
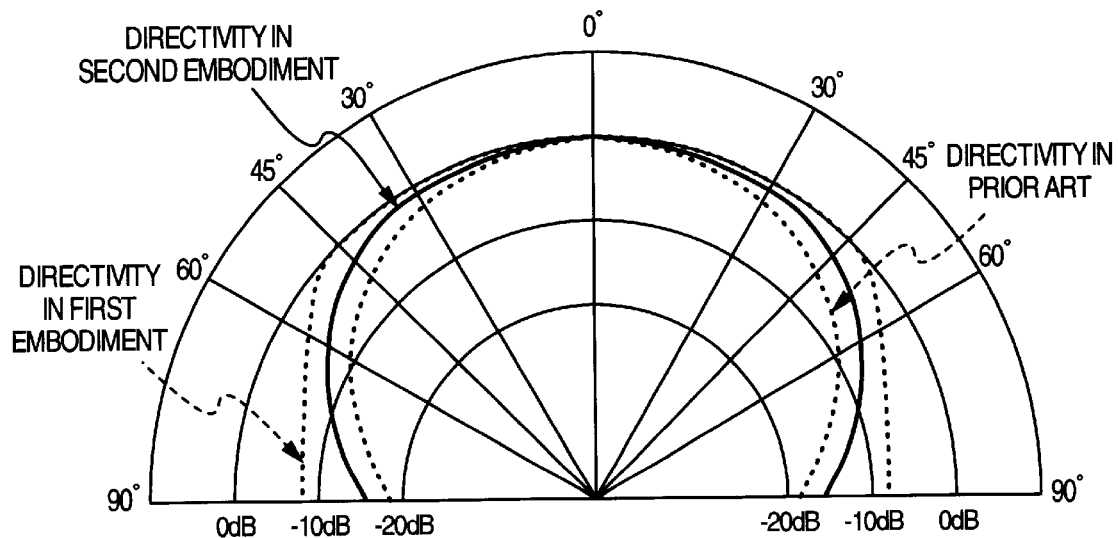
FIG. 12 is a directivity characteristic diagram showing a directivity of the reception sensitivity of the ultrasonic wave sensor employed in the second embodiment.

In the following, a position detection system in accordance with a second embodiment of the present invention will be explained in detail. FIG. 9A is a block diagram showing the composition of the position detection system of the second embodiment, in which the same reference characters as those of FIG. 2A designate the same or corresponding parts to those of FIG. 2A. As shown in FIG. 9A, the system of the second embodiment has basically the same composition as the first embodiment. FIG. 9B is a table for explaining an operational principle the characteristics of the position detection system of the second embodiment. FIG. 10 is a perspective view of an ultrasonic wave sensor which is employed in the position detection system of the second embodiment. FIG. 11 is a cross-sectional view showing the composition of the ultrasonic wave sensor of FIG. 10. FIG. 12 is a directivity diagram showing the directivity of the reception sensitivity of the ultrasonic wave sensor employed in the second embodiment. The ultrasonic wave sensor of the second embodiment has basically the same composition as that of the first embodiment, except the opening 503.

The diameter L2 of the opening 503 of the ultrasonic wave sensor of the second embodiment is set larger than the diameter L1 in the first embodiment (L2>L1) as shown in FIGS. 5 and 11, therefore, the ultrasonic wave sensor of the second embodiment has a directivity shown by a thick curve between dotted curves of the prior art and the first embodiment, as shown in FIG. 12. Therefore, even if the ultrasonic wave sensors 204A and 204B are set as explained with the first embodiment, the angular independence of the received ultrasonic signal intensity can not be realized perfectly (that is, the intensity becomes dependent on both the distance between the stylus 101 and the ultrasonic wave sensor and the angle (direction) of the stylus 101 seen from the ultrasonic wave sensor). Therefore, the coordinate calculation section 200 executes a process for making the received ultrasonic signal intensity constant according to steps shown in FIG. 13. In a step S0, coordinates (X, Y) which have just been calculated are obtained and held. Subsequently, it is judged whether or not the coordinates (X, Y) held in the step S0 are within an area R1 or R3 in FIG. 9A (step S1). The areas R1 and R3 are triangular areas on the board 102 in front of the ultrasonic wave sensor 204B (triangular areas on both sides of the dotted diagonal line of the board 102 within predetermined angles from the diagonal line). On the board 102, other areas R2 (outside the area R1) and R4 (outside the area R3) are also defined. The areas R1 and R3 are symmetrical with each other (in the sense of the angles from the diagonal line), and areas R2 and R4 are also symmetrical with each other. If the stylus 101 existed in the area R1 or R3 ("YES" in the step S1), the probability that the stylus 101 remains in the area R1 or R3 is high, therefore, the process proceeds to a step S2. In the step S2, a first predetermined gain factor ("5" shown in FIG. 9B) which has been stored in the storage section 302 of the coordinate calculation section 200 is selected and the first gain factor "5" is applied for amplification of the ultrasonic signal received from the stylus 101. On the other hand, if the coordinates (X, Y) held in the step S0 are in an area R2 or R4 ("NO" in the step S1), the probability that the stylus 101 remains in the area R2 or R4 is high, therefore, the process proceeds to a step S3. In the step S3, a second predetermined gain factor ("10" shown in FIG. 9B) stored in the storage section 302 is selected and the second gain factor "10" is applied for amplification of the received ultrasonic signal waveform. The table of FIG. 9B indicates the gain factors which are employed by the amplifier 304B of the received signal processing section 203B. The amplifier 304B is controlled by the amplifier 303 of the coordinate calculation section 200 so as to amplify the received ultrasonic signal according to the gain factor selected in the step S2 or S3. The selection of the gain factor of the amplifier 304A of the received signal processing section 203A is also executed similarly (using different areas for the ultrasonic wave sensor 204A).

Figure 13:
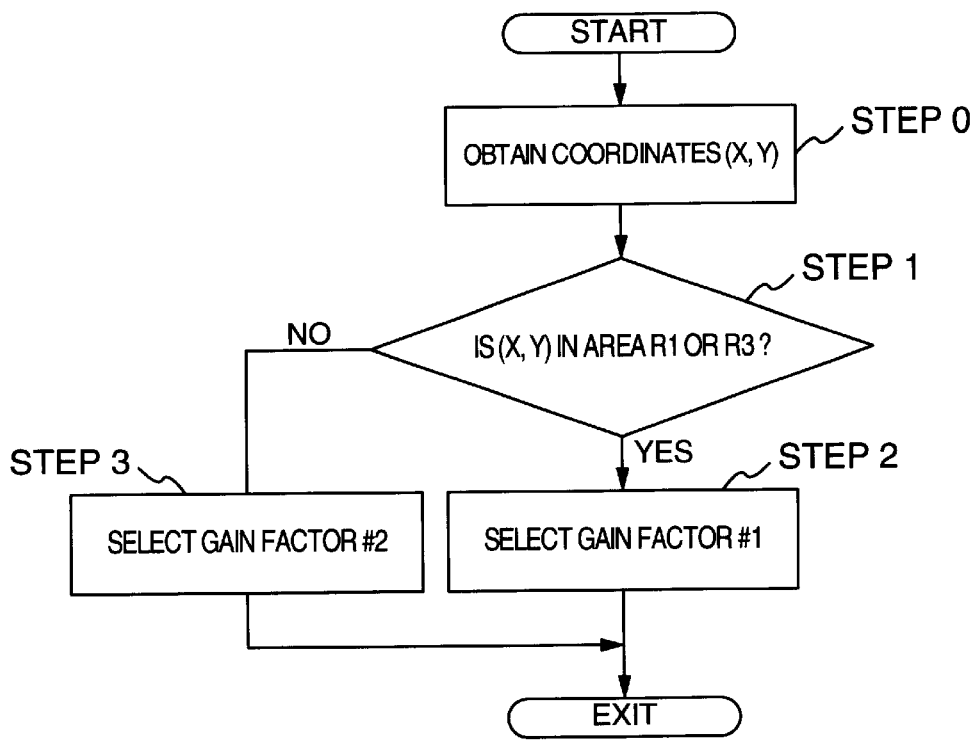
FIG. 13 is a flow chart for explaining gain control which is executed by a coordinate calculation section of the position detection system of the second embodiment.

By the above process of FIG. 13, the gain factor of each amplifier (304A, 304B) is selected properly depending on the area in which the stylus 101 probably or possibly exists. Accordingly, even if the ultrasonic wave sensor has a more or less directivity (angular dependence) of reception sensitivity. Thereby the angular independence of the received ultrasonic signal intensity can be realized (that is, the intensity becomes dependent on the distance only) by the application of the gain factors for the compensation of such directivity. Further, the ultrasonic wave sensor of the second embodiment has an apparently increased sensitivity due to the larger opening 503 in comparison with the first embodiment, therefore, the ultrasonic signal intensity received by the ultrasonic wave sensor can be made higher in comparison with the first embodiment, thereby the S/N (signal-to-noise ratio) of the ultrasonic signal in the received signal processing section (203A, 203B) is improved.

Further, the number of the areas partitioning the board 102 can be set small as shown in FIG. 9A since the angular dependence of the reception sensitivity is smaller than or substantially obviated in comparison with such a case where the ultrasonic wave is directly received by a conventional ultrasonic wave sensor. Therefore, the area in which the stylus 101 exists can be predicted with high reliability (the number of movements of the stylus 101 across area boundaries becomes smaller), thereby the coordinate calculation can be done correctly by use of a simple processing circuit which stores a small number of gain factors.

As mentioned above, in the second embodiment, the coordinate calculation section 200 selects a proper reception gain factor (amplification factor depending on the area and distance) in order to make the received ultrasonic signal intensity constant, and the selected gain factor is applied for the amplification of the received ultrasonic signal waveform by the received signal processing section (203A, 203B). The amplified ultrasonic signal waveform is compared with a predetermined voltage (slice level) for the generation of the timing signal. It is also possible to generate the timing signal by selecting a proper slice level voltage (depending on the area and distance) and comparing the received ultrasonic signal with the selected slice level voltage.

As described above, in the position detection system in accordance with the second embodiment of the present invention, the ultrasonic wave sensors 204A and 204B are designed to receive the ultrasonic wave from the stylus 101 directly without using conventional reflecting plates, thereby the reception units can be implemented in small sizes in the same way as the first embodiment. Further, the ultrasonic signal intensity can be maintained constant by selecting proper gain factor depending on the area and distance, even if the diameter size of the opening 503 is set larger than the first embodiment and thereby a slight directivity (angular dependence) of the ultrasonic wave sensor is caused. Therefore, the coordinate calculation can be executed precisely by use of a simple processing circuit while attaining an improved signal-to-noise ratio of the ultrasonic signal in the received signal processing section (203A, 203B).

[Embodiment 3]

Figure 15:
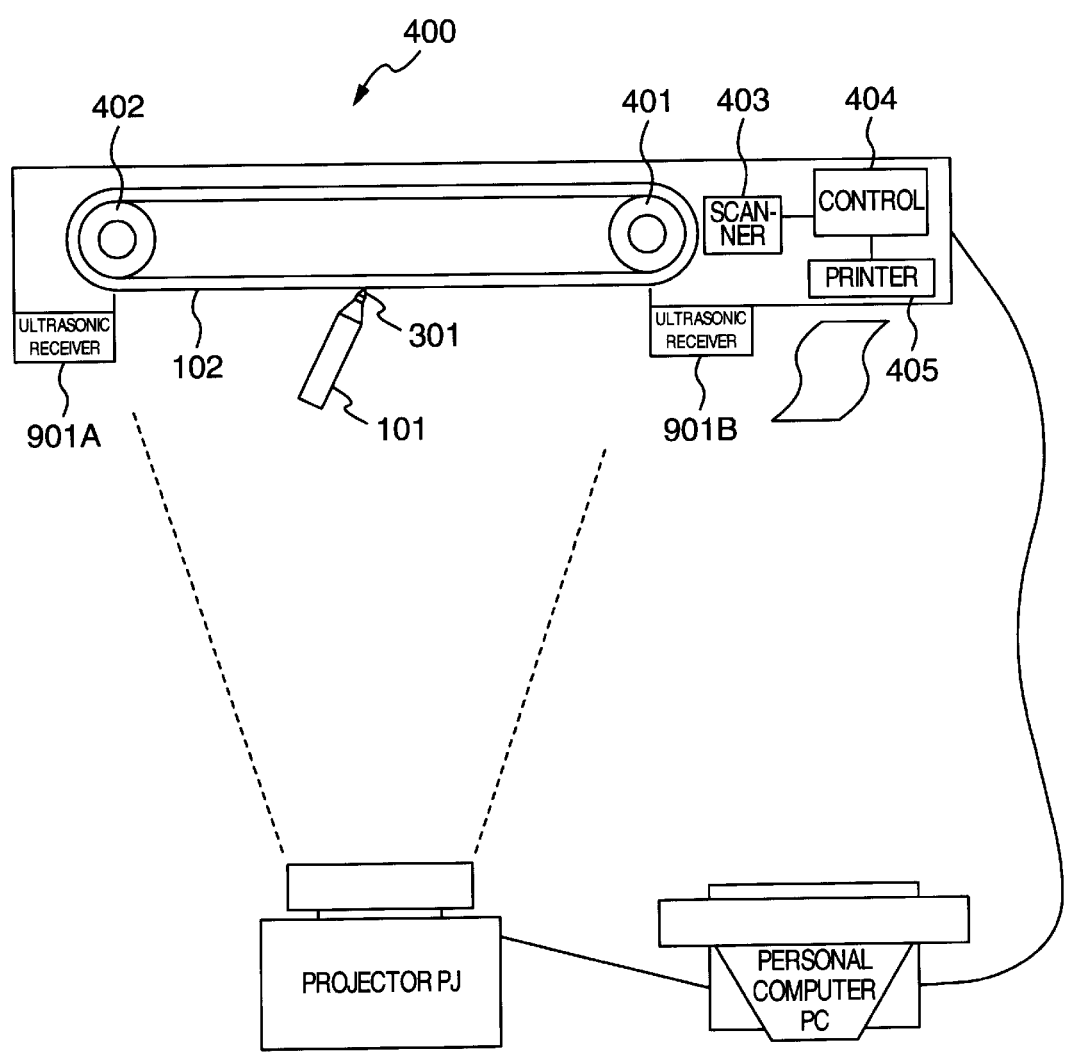
FIG. 15 is a schematic diagram showing a display system in accordance with a third embodiment of the present invention.

FIG. 15 is a schematic diagram showing a display system in accordance with a third embodiment of the present invention. In FIG. 15, reference numerals "901A" and "901B" denote ultrasonic wave reception sections each of which includes an ultrasonic wave sensor (204A, 204B), a photoreceptor section (202A, 202B) and a received signal processing section (203A, 203B). An image which is displayed on a monitor of a personal computer PC is also projected onto an interactive board 400 by a projector PJ. In order to print the projected image on paper, the projected image data is transferred from the personal computer PC to the control section 404 of the interactive board 400. The control section 404 controls the thermal printer 405 to print the image data on paper.

Figure 16A:
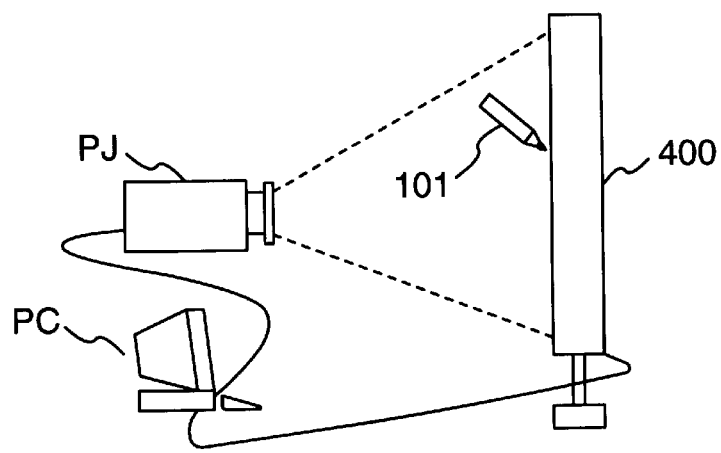
FIGS. 16A through 16C are schematic diagrams explaining examples of usage patterns of the display system of the third embodiment.
Figure 16B:
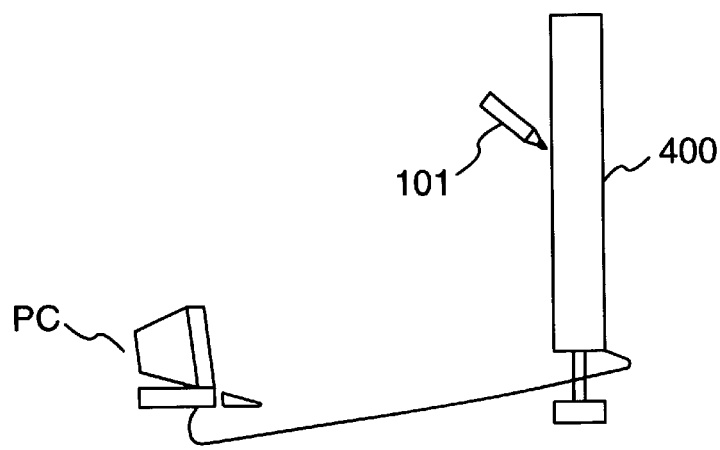
Figure 16C:
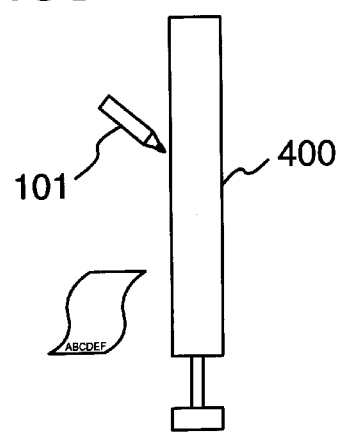

The operation of such an interactive board 400 will hereafter be explained referring to FIGS. 16A through 16C. FIGS. 16A through 16C are schematic diagrams explaining examples of usage patterns of the interactive board 400.

In the example of FIG. 16A, by projecting an image from the projector PJ onto the sheet material 102 of the interactive board 400 by use of the personal computer PC and the projector PJ, the user of the system is allowed to execute PC operations (switching displayed images, drawing letters, lines or pictures, etc.) from the interactive board 400 seeing images projected on the sheet material 102 and using the stylus 101. Ultrasonic wave signals are transmitted periodically by the stylus 101 having the ultrasonic vibration element 301, and the ultrasonic wave reception sections 901A and 901B which received the signals generate the timing signals. In the control section 404, ultrasonic wave propagation times (concerning the ultrasonic wave reception sections 901A and 901B) are determined by use of the timing signals, thereby the distances between the stylus 101 and the ultrasonic wave reception sections 901A and 901B are figured out and thereby the coordinates (X, Y) of the stylus 101 are calculated. The coordinate information is transferred to the personal computer PC and thereby the PC operations depending on the position of the stylus 101 are realized. Such an interactive board 400 is useful for training at personal computer schools, presentations, etc. By connecting two or more personal computers PC via a public network etc., the system can also be employed as a teleconferencing system.

In the example of FIG. 16B, the interactive board 400 is connected to a personal computer PC and a stylus 101 having a marking function is used. Minutes or records of conference proceedings etc. may be written on the interactive board 400 by use of the stylus 101 having the marking function, and at the same time, such coordinates information written by the stylus 101 can be fetched and stored in the personal computer PC. Ultrasonic wave signals are transmitted periodically by the stylus 101, and the ultrasonic wave reception sections 901A and 901B which received the signals generate the timing signals. The control section 404 measures ultrasonic wave propagation times (concerning the ultrasonic wave reception sections 901A and 901B) by use of the timing signals, thereby figures out the distances between the stylus 101 and the ultrasonic wave reception sections 901A and 901B, and thereby calculates the coordinates (X, Y) of the stylus 101. The coordinate information is transferred to the personal computer PC and thereby the storage of the coordinate information in the personal computer PC depending on the position of the stylus 101 is realized. Such an interactive board 400 can also be used for a teleconferencing system by connecting two or more personal computers PC via a public network etc.

Further, in the example of FIG. 16B, the position detection and the storage of the coordinate information in the personal computer PC can also be carried out by use of the scanner 403 rather than the use of ultrasonic wave signals of the position detection. In the case, minutes of conference proceedings etc. are written on the sheet material 102 of the interactive board 400 by use of the stylus 101 having the marking function, and when necessary, power of the interactive board 400 is turned on and the control section 404 is activated. Under control by the control section 404, the sheet material 102 is conveyed by the drive roller 401 and the driven roller 402 and the image on the sheet material 102 is successively scanned by the scanner 403. The scanned image is transferred to the personal computer PC. Such a usage aspect is useful for cases where, for example, only a result of discussion is sent to the other party of a teleconference without sending intermediate matters of the discussion.

In the example of FIG. 16C, the interactive board 400 is not connected to a personal computer PC nor a projector PJ.

Minutes of conference proceedings etc. can be written on the sheet material 102 of the interactive board 400 by use of writing tools or the stylus 101 having the marking function (without turning on the power of the interactive board 400) and, when necessary, a hard copy of the minutes is obtained afterward by turning the interactive board 400 on and activating the control section 404. Under control by the control section 404, the sheet material 102 is conveyed by the drive roller 401 and the driven roller 402 and the image on the sheet material 102 is successively scanned by the scanner 403. The scanned image is printed out by the thermal printer 405. Such an interactive board 400 can be used in a stand-alone manner, and thus a meeting, convention etc. can be started easily and quickly. The interactive board 400 of FIG. 16C is advantageous to energy saving since the power is turned on only when necessary.

As described above, the display system of the third embodiment of the present invention can be used in a variety of usage aspects (from stand-alone to system use with personal computer PC and projector PJ) depending on purposes and conditions of the usage.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A coordinates detection system for detecting coordinates of an object movable to fixed detection means, said system comprising the fixed detection means, signal wave transmitter means and coordinates detection means, wherein:

said signal wave transmitter means is provided at said movable object and generates to transmit signals of electromagnetic wave and ultrasonic wave to said fixed detection means;

said fixed detection means comprises first and second detection means, said first detection means receiving and detecting a signal of electromagnetic wave transmitted from said transmitter means, and said second detection means detecting a signal of ultrasonic wave transmitted directly from said transmitter means;

said coordinates detection means detecting coordinates of a position of said movable object provided with said transmitter means by detecting a time difference between the detection of the transmitted waves of said first and said second detection means;

said second detection means defining an opening, the size of the opening being smaller than a detection element cone section of the second detection means, for passing therethrough to further transmit the transmitted signal of ultrasonic wave to said cone section by making the transmitted ultrasonic wave propagate radially from a center of opening to said cone section.

2. A coordinate detection system as claimed in claim 1, wherein said coordinate detection means includes amplification means having an amplification factor to be changed for amplification of the transmitted ultrasonic wave signal in dependence upon the detected coordinates of the object position.

3. A coordinate detection system as claimed in claim 1, wherein said coordinate detection means includes storage means for storing the detected coordinates of said movable object.

4. A coordinate detection system as claimed in claim 3, wherein said coordinate detection means selects a gain factor or a slice level for generation of a timing signal depending on position coordinates read out from said storage means.

5. A coordinate detection system as claimed in claim 2, wherein said coordinate detection means defines and partitions a coordinate space into a predetermined number of areas, said movable object being moved in said areas, said coordinate detection means include means for determining different gain factors depending on said areas.

6. A coordinate detection system as claimed in claim 2, wherein said coordinate detection means includes means for selectively applying a gain factor for the amplification of the signal of transmitted ultrasonic wave in dependence upon a position area in which said transmitter means exists.

7. A display system comprising:

board means and writing means movable thereon for generating to transmit signals of electromagnetic wave and ultrasonic wave, thereby transmitting information of a position of said writing means on said board;

first detection means for detecting a signal of electromagnetic wave transmitted from said writing means;

second detection means for detecting a signal of said ultrasonic wave transmitted from said writing means;

position detection means for detecting a position of said writing means on said board means based on signal detection results of said first detection means and said second detection means;

storage means for storing position information detected by said position detection means;

a computer having display means; and transmission means for transmitting said position information stored in said storage means to said computer and enabling said display means based on the transmitted position information; wherein said second detection means defines an opening, the size of the opening being smaller than a detection element cone section of the second detection means, for passing to further transmit therethrough the transmitted signal of ultrasonic wave to said cone section by making the further transmitted ultrasonic wave propagate radially from a center of said opening to said cone section.

8. A display system as claimed in claim 7, further comprising reading means for reading images at least written on said board means.

9. A display system as claimed in claim 8, further comprising output means for outputting information at least of said images read by said reading means.

10. A display system as claimed in claim 7, further including means for executing PC operations for switching of images displayed on said display means from said board means by operating said writing means.

11. A display system as claimed in claim 7, wherein letters can be written on said board means even if said writing means is one having marking function.

12. A display system as claimed in claim 7, further comprising conveying means for conveying drawing means.

13. A display system as claimed in claim 8, further comprising data sending means for sending data obtained by said reading means to said computer.

14. A position detection system comprising:

signal transmitter means for generating to transmit an ultrasonic wave;

detection means, having a detection element cone section, for detecting the ultrasonic wave transmitted from said transmitter means, said detection means having means for defining an opening to make the transmitted ultrasonic wave pass therethrough for further transmission for the detection of the transmitted ultrasonic wave, said opening having a size smaller than that of said detection element cone section to make the further transmitted ultrasonic wave propagate radially from a center of said opening to said detection element cone section; and position detection means for detecting a position of said transmitter means based on a detection result of the detection means.

15. A position detection system comprising:

signal transmitter means for generating to transmit an ultrasonic wave;

detection means for detecting an ultrasonic wave transmitted from said transmitter means;

means for defining an opening to make an ultrasonic wave transmitted from said transmitter means pass through said opening for further transmission to said detection means, said opening having a size smaller than that of a detection element cone section of said detection means to make the further transmitted ultrasonic wave propagate radially from a center of said opening to said detection element cone section; and position detection means for detecting a position of said transmitter means based on a detection result of the detection means.

16. A position detection system comprising:

signal transmitter means for generating to transmit an electromagnetic wave and an ultrasonic wave;

first detection means for detecting the electromagnetic wave generated from said transmitter means;

second detection means for detecting the ultrasonic wave transmitted from said transmitter means, said second detection means having means for defining an opening to make the transmitted ultrasonic wave pass therethrough for further transmission for the detection of the transmitted ultrasonic wave by said second detection means, said opening having a size smaller than that of a detection element cone section of said second detection means to make the further transmitted ultrasonic wave propagate radially from a center of said opening; and position detection means for detecting a position of said transmitter means based on detection results of said first and second detection means.

17. The system of claim 16, wherein said electromagnetic wave is a light wave.

18. A position detection system as claimed in claim 16, wherein said transmitter means generate to transmit sequential light signals as the electromagnetic wave signal and wherein said first detection means receives a first light signal and thereafter a second light signal.

19. A position detection system as claimed in claim 18, further including a display and color designation means for detecting a time difference between said first light signal and said second light signal received by said first detection means in order to designate a color display of the detected position.

20. A position detection system as claimed in claim 16, said transmitter means transmits said electromagnetic wave and said ultrasonic wave simultaneously.

21. A position detection system as claimed in claim 16, wherein said first detection means and said second detection means are provided with means for generating timing signals.

22. A position detection system as claimed in claim 16, wherein said second detection means includes amplification means for receiving and amplifying the transmitted ultrasonic wave signal.

* * * * *